United States Patent [19]
Sasaki et al.

[11] Patent Number: 5,239,960
[45] Date of Patent: Aug. 31, 1993

[54] ENGINE INDUCTION SYSTEM PROVIDED WITH A MECHANICAL SUPERCHARGER

[75] Inventors: Junsou Sasaki; Yasuhide Yano; Mitsuo Hitomi, all of Hiroshima, Japan

[73] Assignee: Mazda Motor Corporation, Hiroshima, Japan

[21] Appl. No.: 915,630

[22] Filed: Jul. 21, 1992

[30] Foreign Application Priority Data

| Jul. 30, 1991 | [JP] | Japan | 3-190114 |
| Aug. 29, 1991 | [JP] | Japan | 3-242367 |
| Sep. 30, 1991 | [JP] | Japan | 3-252350 |

[51] Int. Cl.$^5$ .................................. F02B 31/00
[52] U.S. Cl. ................................ 123/308; 123/432; 123/339
[58] Field of Search ........................ 123/308, 432, 339

[56] References Cited

U.S. PATENT DOCUMENTS

| 4,566,422 | 1/1986 | Tadokoro et al. | 123/432 |
| 4,628,880 | 12/1986 | Aoyama et al. | 123/432 |
| 4,669,434 | 6/1987 | Okumura et al. | 123/308 |
| 4,732,124 | 3/1988 | Nakamura et al. | 123/308 |
| 4,811,231 | 3/1989 | Hataoka et al. | 123/308 |
| 4,821,686 | 4/1989 | Baike et al. | 123/308 |

FOREIGN PATENT DOCUMENTS

| 0035143 | 2/1985 | Japan | 123/308 |
| 61-58920 | 3/1986 | Japan . | |
| 61-218726 | 9/1986 | Japan . | |
| 1-104920 | 4/1989 | Japan . | |

*Primary Examiner*—E. Rollins Cross
*Assistant Examiner*—Erick Solis
*Attorney, Agent, or Firm*—Fish & Richardson

[57] ABSTRACT

A mechanical supercharger is provided in an intake manifold, and two inlet ports in communication with a cylinder are provided. A swirl control valve disposed in one of the two inlet ports is opened in a low speed/medium load region, and closed in a low speed/high load region and a low speed/low load region. Accordingly, scavenging performance can be enhanced in the low speed/medium load region where the pressure of a supercharged mixture flow is not sufficiently higher than the pressure of exhaust gas. In the low speed/high load region where the pressure of the supercharged mixture flow is sufficiently higher than the pressure of exhaust gas, undesired blowing of the mixture through a combustion chamber without being used for combustion can be suppressed while ensuring satisfactory scavenging, and an occurrence of knocking can be prevented.

7 Claims, 14 Drawing Sheets

ENGINE INDUCTION SYSTEM PROVIDED WITH A MECHANICAL SUPERCHARGER

BACKGROUND OF THE INVENTION AND RELATED ART STATEMENT

This invention relates to an engine induction system provided with a mechanical supercharger disposed in an intake manifold and a swirl control valve disposed in one of two inlet ports provided for each cylinder.

There has been known an induction system having the following construction as, for example, disclosed in Unexamined Japanese Patent Publication No. 1-104920. In this system, a mechanical supercharger for supercharging intake air to be admitted into combustion chambers defined in respective cylinders is disposed in an upstream portion of an intake manifold. In addition, two inlet ports are formed at a downstream portion of the intake manifold so as to be communicated with a corresponding cylinder, and inlet valves are provided at downstream end openings of the respective inlet ports. In one of the two inlet ports for each cylinder is disposed a swirl control valve which is opened at least in a high speed/high load region. In an example shown in FIG. 4 of the above publication, the swirl control valve is opened in a high speed range and a low speed/high load region while closed in low and medium load regions of a low speed range.

Further, in the above system, one of the inlet valves for each cylinder is opened at an earlier timing than the other, and thereby an overlap period of openings of the inlet and exhaust valves for the cylinder is set long. Hereinafter, such an overlap period will be referred to as a valve timing overlap period. The swirl control valve is disposed in the inlet port corresponding to the inlet valve opened at a delayed timing. While the swirl control valve is opened, exhaust gas in a combustion chamber is sufficiently scavenged during a long overlap period by introducing the supercharged intake air into the combustion chamber from the supercharger.

However, this induction system suffers the following problems. When the swirl control valve is opened in a low speed/high load region where the pressure of the supercharged intake air (hereinafter referred to as supercharged pressure) is high, the intake air is liable to the blown through the combustion chamber without being used for combustion though improved scavenging may be obtainable. Also, in a low speed/medium load region where the supercharged pressure is lower than in the low speed/high load region and a considerable output performance is required, closure of the swirl control valve results in insufficient scavenging. This is disadvantageous in terms of the output performance and suppression of knocking.

Further, if the swirl control valve is disposed in the inlet port corresponding to the inlet valve opened at the earlier timing, the valve opening overlap period is shortened when the swirl control valve is closed. Accordingly, it becomes difficult to attain improved scavenging.

Unexamined Japanese Patent Publication No. 61-218726 discloses an induction system having two inlet ports in communication with a corresponding cylinder, a swirl control valve is disposed in one of the two inlet ports for the cylinder, and respective inlet ports are opened at different timings. However, this publication does not sufficiently mention the scavenging efficiency in the case where the above arrangement is combined with a supercharger. Further, Unexamined Japanese Patent Publication No. 61-58920 discloses an induction system having two inlet valves and two exhaust valves in communication with a corresponding cylinder, the inlet valves are differently sized and opened at different timings, and the exhaust valves are differently sized and opened at different timings. However, this publication does not teach a concept of a combined use of a supercharger and a swirl control valve. Accordingly, these induction systems have more room for improvement in supercharging according to an operating condition and scavenging efficiency.

SUMMARY OF THE INVENTION

It is an object of the invention to provide an engine induction system provided with a mechanical supercharger which is effective in improving scavenging, suppressing the undesired likelihood that a mixture flow blows through a combustion chamber without being used for combustion while attaining sufficient scavenging in a low speed/high load region or like region, and preventing a occurrence of knocking.

Accordingly, the invention is directed to an induction system for use in an engine including a cylinder having a combustion chamber. The induction system comprises an intake manifold having first and second inlet ports in communication with the cylinder, a mechanical supercharger disposed in the intake manifold, and valve means disposed in the second inlet port for controlling generation of swirl in the combustion chamber, the valve means being operable to open and close the second inlet port. The induction system further comprises control means for controlling the valve means to open the second inlet port in a low speed/medium load operating region of the engine while controlling the same to close the second inlet port in a low speed/high load region and a low speed/low load operating region of the engine.

The induction system may comprise first and second exhaust ports in communication with the cylinder, first and second inlet valves provided respectively for the first and second inlet ports, and first and second exhaust valves provided respectively for the first and second exhaust ports, the first exhaust valve being positioned more spaced apart from the first inlet valve than the second exhaust valve. It may be advantageous to provide valve lifting means for opening the first inlet valve at an earlier timing than the second inlet valve and for closing the second exhaust valve at an earlier timing than the first exhaust valve, such that an overlap period of openings of the first inlet valve and first exhaust valve is longer than any other overlap period of openings of the inlet and exhaust valves.

Further, the respective overlap periods may be changeable according to the operating region of the engine.

These and other objects, features and advantages of the present invention will become more apparent upon a reading of the following detailed description and accompanying drawings.

DETAILED DESCRIPTION OF PREFERRED EMBODIMENTS OF THE INVENTION

Embodiments of the invention will be described with reference to the accompanying drawings.

Figure 1:
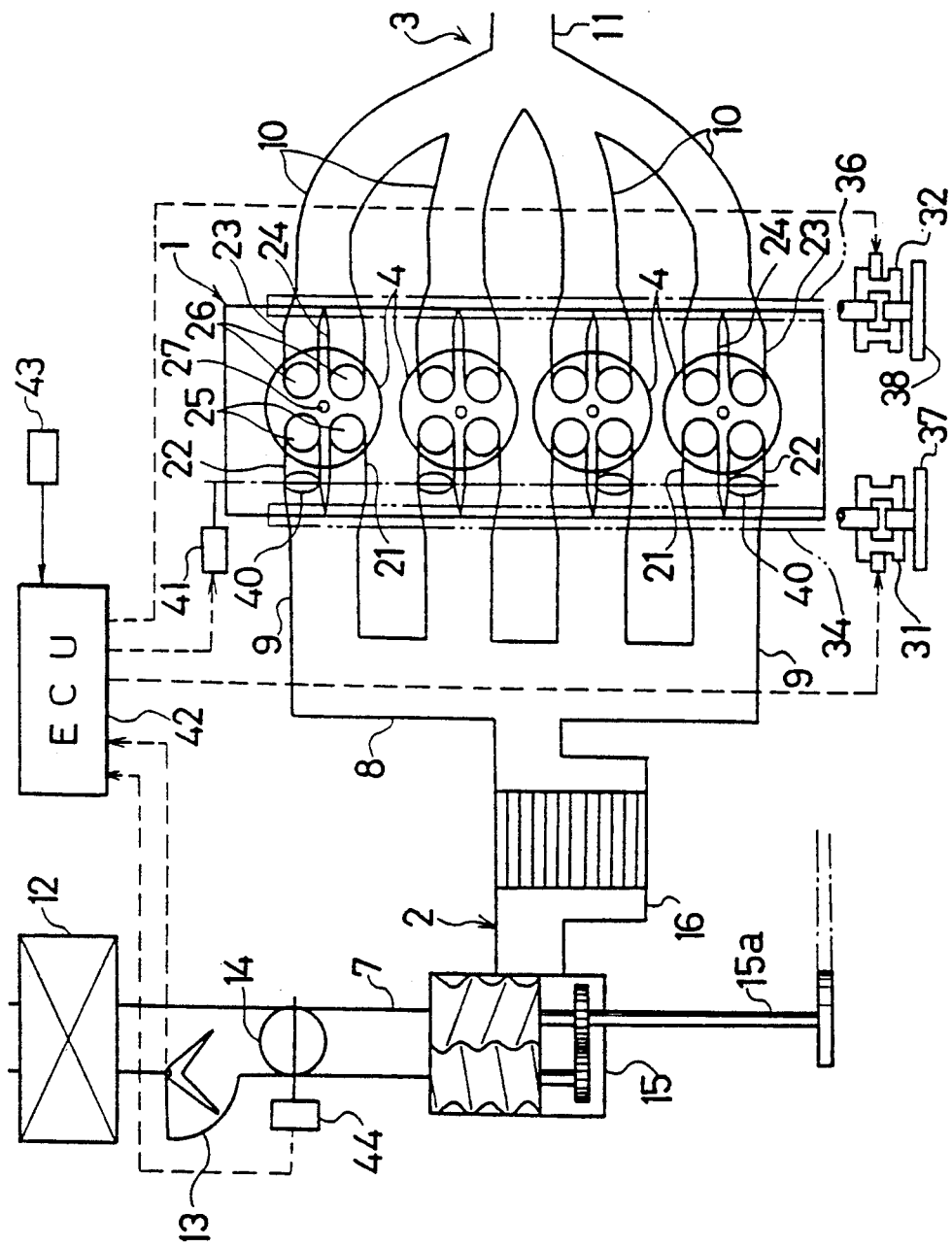
FIG. 1 is a schematic plan view showing an entire construction of an induction system in accordance with the invention as a first embodiment.
Figure 2:
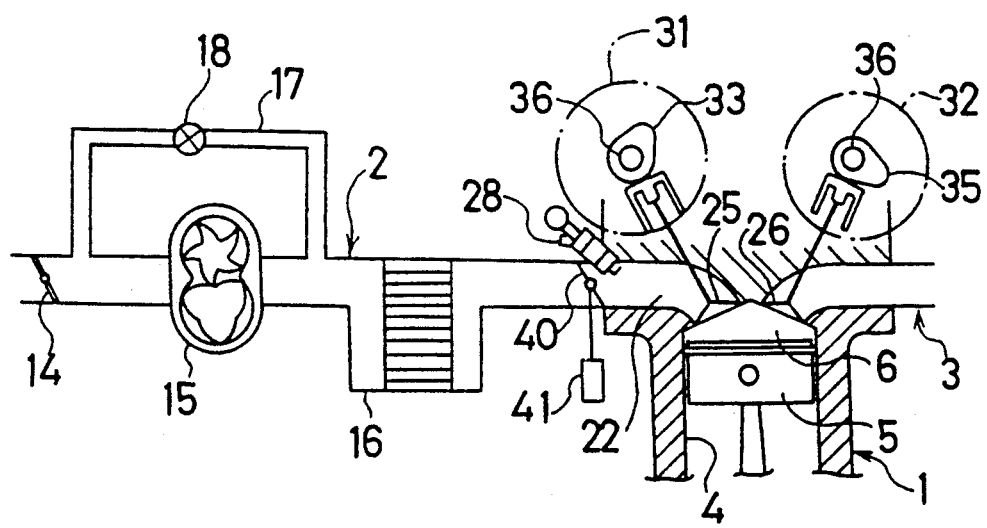
FIG. 2 is a schematic sectional view of the first induction system.

FIGS. 1 and 2 shows the first embodiment of the invention. In these figures, indicated at 1 is an engine main body, at 2 an intake passage, and at 3 an exhaust passage. An engine shown in FIG. 1 is a four-cylinder engine, and four cylinders 4 are arranged in the engine main body 1 a row along a vertical direction in the drawing of FIG. 1. In each cylinder 4, a combustion chamber 6 is defined above a piston 5.

The intake passage 2 includes a common intake passage 7 located at an upstream side, surge tank 8 connected to a downstream end of the common intake passage 7, and four individual intake runners 9 branched from the surge tank 8. Further, the exhaust passage 3 includes four individual exhaust pipes 10 extending from the corresponding cylinder 4, and a common exhaust passage 11 located downstream of a convergent portion to which downstream ends of the individual exhaust pipes 10 are convergedly connected.

In the common intake passage 7 are provided an air cleaner 12, air-flow meter 13 for detecting an amount of intake air inducted into the induction system, and throttle valve 14, mechanical supercharger 15, and intercooler 16 for cooling the intake air arranged in this order from the upstream side. The mechanical supercharger 15 has a drive shaft 15a which is connected to a crank shaft (not shown) of the engine through a belt or like means, and is therefore driven by the engine. Indicated at 17 is a bypass pipe bypassing the supercharger 15, and at 18 a pressure relief valve. The valve 18 is provided in the bypass pipe 17 for relieving a portion of the supercharged intake air in the case where the pressure of the intake air rise beyond a specified limit.

A downstream end portion of each intake runner 9 are branched into two passage portions serving as first and second inlet ports 21, 22 in communication with the corresponding cylinder. The downstream ends of the inlet ports 21, 22 are opened to the combustion chambers of the respective cylinders 4. As can be seen from FIG. 1, an upstream end portion of each exhaust pipe 10 are branched into two passage portions serving as exhaust ports 23, 24 in communication with the corresponding cylinder. Inlet valves 25 and exhaust valves 26 are provided at the downstream ends and upstream ends of the inlet ports 21, 22 and exhaust ports 23, 24 respectively. At a center of each combustion chamber 6 is provided an ignition plug 27. Further, an injector 28 is provided in a specified position of each intake runner 9 for injecting fuel to the intake air flow so as to obtain air and fuel mixture (hereinafter referred to merely as mixture).

In valve lifting mechanisms for the inlet and exhaust valves 25, 26 is provided valve timing changer mechanisms 31, 32. The valve lifting mechanisms are arranged above the engine main body 1. The inlet valve lifting mechanism is provided with a cam shaft 34, cams 33 mounted on the cam shaft 34 in positions corresponding to the respective inlet valves 25, and cam pulley 37 driven in association with the crank shaft. Likewise, the exhaust valve lifting mechanism is provided with a cam shaft 34, cams 35 mounted on the cam shaft 34 in positions corresponding to the respective exhaust valves 26, and cam pulley 38 driven in association with the crank shaft. The valve timing changer mechanism 31 is incorporated into the inlet valve lifting mechanism between the cam shaft 35 and cam pulley 37, whereas the valve timing changer mechanism 32 is incorporated into the exhaust valve lifting mechanism between the cam shaft 36 and cam pulley 38. With this arrangement, the valve lifting mechanisms are allowed to change an overlap period of openings of the inlet valves 25 and exhaust valves 26. The changer mechanisms 31, 32 respectively operate in response to valve timing control signals sent from a control unit to be described below.

The first inlet ports 21 are constantly open. However, each of the second inlet ports 22 has a swirl control valve 40 provided in a specified position thereof, and therefore is changed over between an open state and a closed state according to an operating condition of the engine. The swirl control valve 40 is actuated by an actuator 41 which operates in response to a swirl control signal from the control unit.

Indicated at 42 is a control unit (ECU) for controlling the swirl control valves 40 and valve timing changer mechanisms 31, 32. To the ECU 42 are input sensor signals from the air-flow meter 13, engine speed sensor for detecting an engine speed, throttle opening sensor 44 for detecting an opening of the throttle valve 14 as an equivalence of an amount of engine load. In accordance with received sensor signals, the ECU 42 sends the control signals to the actuator 41 for the swirl control valves 40 and the changer mechanism 31, 32.

Figure 3:
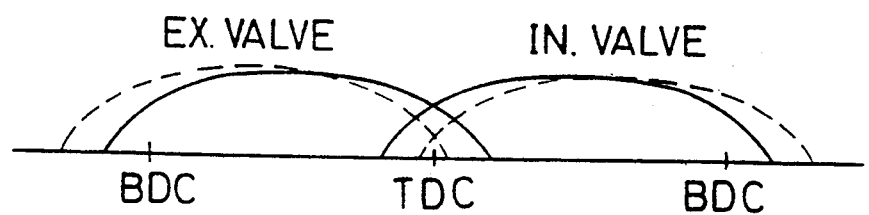
FIG. 3 is a diagram showing the valve lift of inlet and exhaust valves plotted against the angular rotation of a crankshaft in the first induction system.

In accordance with the sensor signals from the ECU 42, the valve timing charger mechanisms 31, 32 changes opening timings of the inlet valves 25 and exhaust valves 26 between first opening timings as indicated by broken line in FIG. 3 at which the valve opening overlap period is short and second opening timings as indicated by solid line in the same figure. The ECU 42 controls the changer mechanisms 31, 32 in accordance with the sensor signals from the engine speed sensor 43, and throttle opening sensor 44 or air-flow meter 13 in the following manner. The ECU 42 controls the changer mechanisms 31, 32 so as to shorten the valve opening overlap period in a very low speed/low load region indicated at A1 in FIG. 4 and to lengthen the valve opening overlap period in other regions A, B, C, and D.

Further, the ECU 42 controls the swirl control valves 40 in accordance with the engine speed detected by the engine sensor 43 and the engine load detected by the throttle opening sensor 44 in the following manner. Basically, the swirl control valves 40 are closed in the low speed range while opened in the high speed range. However, a feature of this embodiment resides in the construction wherein the swirl valves 40 are opened in the medium load zone of the low speed range.

More specifically, the low speed range defined by horizontal and vertical axes, and slanting line 45 is divided into a low speed/low load region A including the region A1, low speed/medium load region B, and low speed/high load region C. The swirl control valves 40 are closed in the region A excluding region A1 and region C, while closed in the region B. The low speed/low load region A is a region where generation of a swirl is required in order to ensure combustion stability. The low speed/high load region C is a region where the pressure Ps of the intake air supercharged by the supercharger 15 is higher than the pressure of exhaust gas (thereinafter referred to as exhaust pressure Pe), and the pressure difference between the supercharged pressure Ps and exhaust pressure Pe is equal to or greater than a specified value P0 which is sufficient for scavenging the exhaust gas; $Pc-Pe \geq P0$. On the other hand, the low speed/medium load region B is a region where the supercharging and scavenging actions are required in order to ensure a certain level of engine output performance, and the supercharged pressure Ps is not sufficiently higher than the exhaust pressure Pe; $Pc-Pe<P0$. In the higher speed region D defined as a range on the right of the line 45 in FIG. 4, the swirl control valves 40 are opened so as to attain a sufficient amount of intake air.

Figure 4:
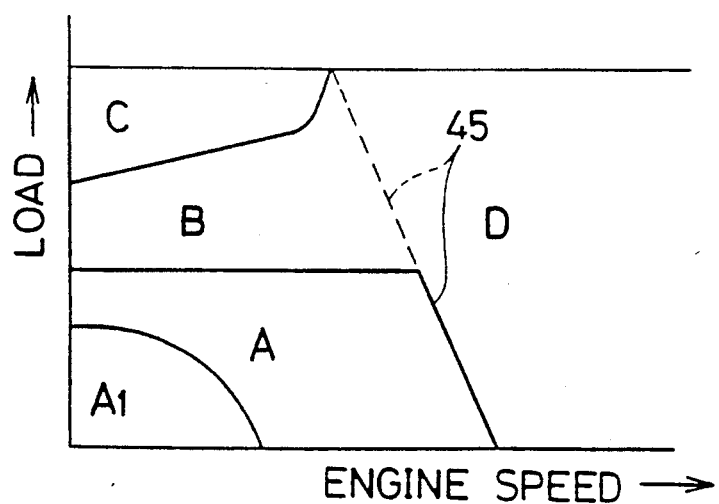
FIG. 4 is a diagram showing a control map representing operating regions of an engine which are used to control a swirl control valve and valve timing changer mechanism.

A control map defining the regions A1, A, B, C, and D shown in FIG. 4 is prestored in the ECU 42. The ECU 42 determines in which region the operating condition detected by the sensors 43, 44 lies in accordance with the control map, and controls the valve timing changer mechanisms 31, 32 and swirl control valves 40.

Figure 5:
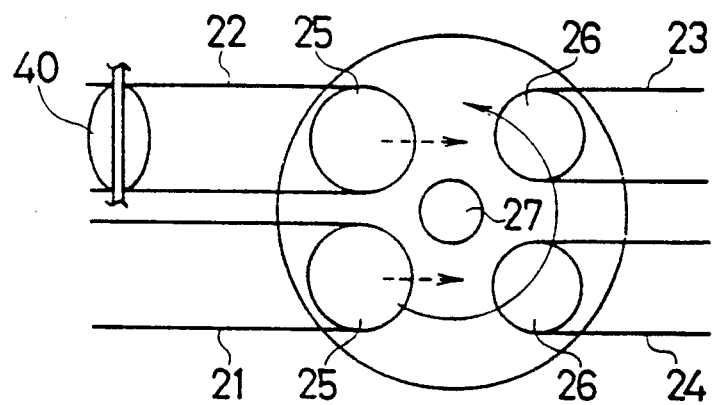
FIG. 5 is a diagram showing movements of fuel and air mixture in a combustion chamber of the first induction system.

Next, there will be described operations of the first embodiment described above with reference to FIG. 5.

In the low speed/high load region C, the second inlet ports 22 are closed by the swirl control valves 40, and accordingly the supercharged air and fuel mixture is introduced into the combustion chambers 6 only through the first inlet ports 21. Even in this state, the valve opening overlap period is long and the supercharged pressure Ps is considerably higher than the exhaust pressure. Accordingly, the exhaust gas remaining in the combustion chambers 6 can be sufficiently scavenged during the valve opening overlap period. By introducing the mixture flow into the combustion chamber 6 only through the first inlet ports 21, the undesired likelihood that the mixture blows through the combustion chamber 6 to an exhaust manifold without being used for combustion can be suppressed. In addition to the above, a swirl can be generated in each combustion chamber 6 as indicated by a solid lined arrow in FIG. 5, thereby developing a normal propagation of flames. Therefore, it is advantageous in suppressing an occurrence of knocking to close the swirl control valves 40 in the region C.

On the other hand, in the low speed/medium load region B where a certain level of engine output performance is required and the supercharged pressure Ps is lower than in the low speed/high load region C, the improved scavenging is obtainable by opening the swirl control valves 40. More specifically, in this region, the exhaust gas remaining in the combustion chambers 6 near the second inlet ports 22 cannot be scavenged sufficiently merely by introducing the supercharged mixture flow through the first inlet ports 21, because the pressure difference between the supercharged pressure Ps and exhaust pressure Pe is small. However, the scavenging performance can be improved by opening the swirl control valves 40 to introduce the mixture flow through both inlet ports 21 and 22 as indicated by broken lined arrows in FIG. 5.

In the low speed/low load region A, since the amount of mixture introduced into the combustion chambers 6 is small, improved combustibility due to the swirl generation is required more than improved scavenging effect. Accordingly, the swirl control valves 40 are closed to generate the swirl in the combustion chambers 6. Further, in the region A1 where the amount of mixture is particularly small, the combustion stability can be also enhanced by shortening the valve opening overlap period.

Figure 6:
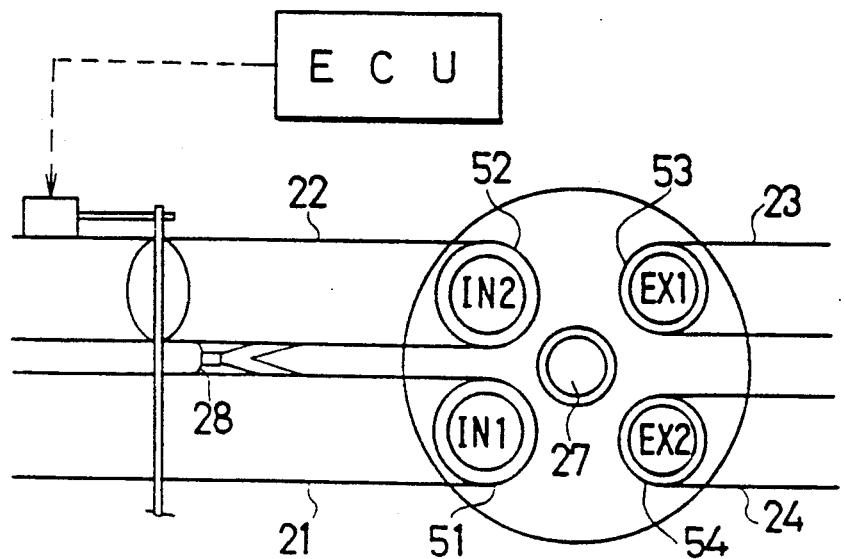
FIG. 6 is a schematic plan view showing essential parts of an induction system in accordance with the invention as a second embodiment.

Next, a second embodiment of the invention will be described with reference to FIGS. 6 and 7. In this embodiment as well, two inlet ports (first and second inlet ports) 21, 22 and two exhaust ports (first and second exhaust ports) 23, 24 are provided for each cylinder 4. There are also provided two inlet valves (first and second inlet valves) 51, 52 for the corresponding inlet ports 21, 22, two exhaust valves (first and second exhaust valves) 53, 54 for the corresponding exhaust ports 23, 24, and ignition plug 27 in a combustion chamber 6 defined in each cylinder 4. The inlet valves 51, 52 are positioned side by side on an inlet side of the combustion chamber 6, whereas the exhaust valves 53, 54 are positioned side by side on an exhaust side of the combustion chamber 6.

Hereafter, description on construction and operation of an induction system of the invention will be directed to one cylinder and associated elements thereof. Opening timings of the inlet valves 51, 52 are different. The first inlet valve 51 (IN1) is opened at an earlier timing than the second inlet valve 52 (IN2) by a specified period of time. Also, closing timings of the exhaust valves 53, 54 are different. The second exhaust valve 54 (EX2) positioned on a diagonal line extending from the first inlet valve 51 through a center of a cylinder bore, i.e. opposing to the second inlet valve 52, is closed at a delayed timing relative to the first exhaust valve 53 (EX1) positioned on a diagonal line extending from the second inlet valve 52 through a center of the cylinder bore, i.e. opposing to the first inlet valve 51. Valve opening overlap periods OLa1, OLa2; and OLb, OLc are those of the opposing inlet and exhaust valves 51, 54; 52, 53, and of the diagonally positioned inlet and exhaust valves 51, 53; 52, 54. These overlap periods are set in such a manner that the overlap period OLb is longer than the overlap periods OLa1, Ola2, and the overlap period OLc IS shorter than the overlap periods OLa1, OLa2.

A swirl control valve 40 is provided in the second inlet port 22 corresponding to the second inlet valve 52 opened at the delayed timing, and openably and closably actuated by an actuator 41 to which a swirl control signal is sent from a control unit (ECU) 42. Similarly to the first embodiment, the swirl control valve 40 is basically closed in a low speed range of an engine and opened in a high speed range thereof. Preferably, the valve 40 is closed in a low speed/low load region A and a low speed/high load region C and opened in a low speed/medium load region B and a high speed region D (see FIG. 3).

Hereinafter, operations of the second embodiment will be described.

In a state where the swirl control valve 40 is opened, the intake air supercharged by a mechanical supercharger 15 together with fuel injected from an injector 28 is introduced into the combustion chamber 6 through both inlet ports 21, 22, and thereby the exhaust gas is scavenged by the supercharged mixture during the valve opening overlap period. In this case, if the overlap periods of the opposing inlet and exhaust valves is long, the mixture is more liable to blow through the combination chamber without being used for combustion between these valves. However, since the diagonally positioned inlet and exhaust valves are sufficiently spaced apart, the mixture is less liable to be blown through the combustion chamber. Accordingly, the scavenging efficiency is enhanced while suppressing the undesired blowing of the mixture through the combustion chamber by setting the overlap period OLb longer than the overlap periods OLa1, OLa2. Further, since the swirl is generated in the combustion chamber 6 until the second inlet valve 52 is opened following opening of the first inlet valve 51. Accordingly, the swirl of a certain level can be obtained even in a state where the swirl control valve 40 is opened. Therefore, it is effective in improving the scavenging efficiency and combustibility and suppressing an occurrence of knocking to open the swirl control valve 40 in the low speed/medium load region or the like.

On the other hand, in a state where the swirl control valve 40 is closed, the mixture flow is introduced into the combustion chamber 6 only through the first inlet port 21. Even in this state, the scavenging can be carried out sufficiently in the case where the supercharged pressure Ps is higher than the exhaust pressure Pe by a specified amount or more. This is because the mixture flow is introduced through the first inlet valve 51 opened at the earlier timing, and a long overlap period is ensured by the inlet and exhaust valves 51 and 53 diagonally positioned and substantially spaced apart. In addition, a stronger swirl can be generated in the combustion chamber in this state. Therefore, it is effective in improving the scavenging and suppressing the occurrence of knocking to close the swirl control valve 40 in the low speed/high load region or the like.

In the second embodiment, the valve opening overlap periods of the inlet and exhaust valves may be changed according to an operating condition of the engine by incorporating a valve timing changer mechanism into the induction system as will be described in a third embodiment.

Next, a third embodiment will be described with reference to FIGS. 8 to 12.

In this embodiment, there are provided first and second inlet valves 51, 52 and first and second exhaust valves 53, 54 for each cylinder. Further, a valve timing changer mechanism is provided for changing opening timings of at least either the inlet valves or exhaust valves. For instance, a valve timing changer mechanism 32 is provided for changing the opening timings of the exhaust valves. The changer mechanism 32 includes a hydraulic mechanism 32a provided at a drive side, and is capable of changing the rotational phase of a cam shaft 36 provided at an exhaust side in accordance with a signal applied to the hydraulic mechanism 32a from a control unit (ECU) 42.

Figure 7:
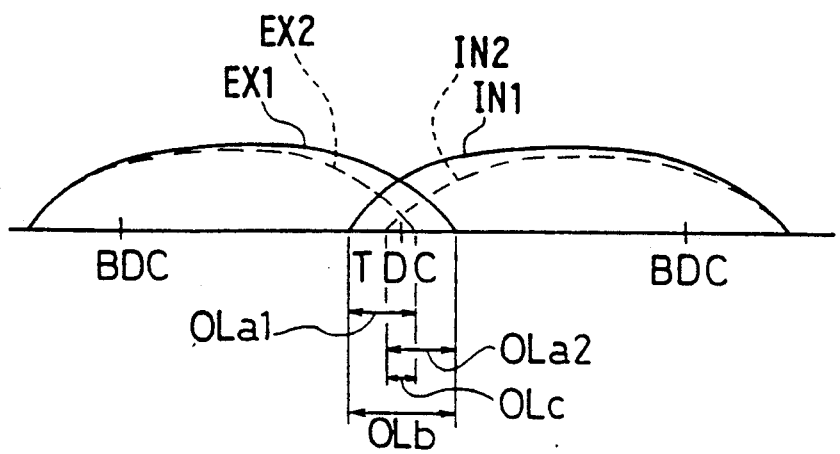
FIG. 7 is a diagram showing the valve lift of inlet and exhaust valves plotted against the angular rotation of a crankshaft in the second induction system.
Figure 8:
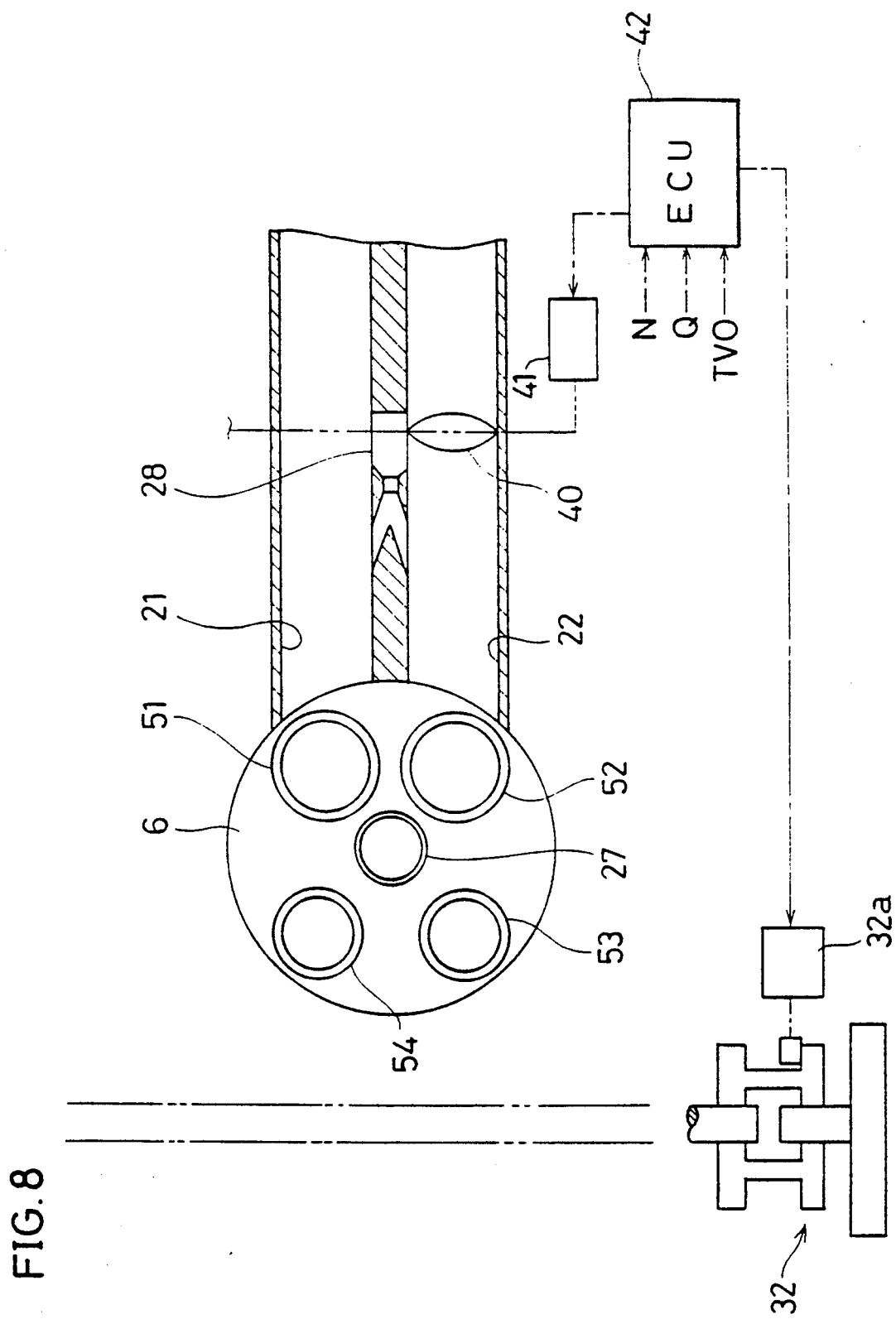
FIG. 8 is a plan view in section showing essential parts of an induction system in accordance with the invention as a third embodiment.

The opening timings of the inlet valves 51, 52 and exhaust valves 53, 54 are set so as to have characteristics as shown in FIG. 7 similarly to the second embodiment in the case where the cam shaft 36 is rotated at a delayed timing by the valve opening timing changer mechanism 32, i.e. the valve opening overlap periods are lengthened. More specifically, the overlap period of the first inlet valve 51 and first exhaust valve 53 positioned diagonally and symmetrically with respect to a center of a cylinder bore becomes relatively longer. The overlap period of the second inlet valve 52 and second exhaust valve 54 positioned diagonally becomes approximately zero. Further, the overlap period of the opposing first inlet valve 51 and second exhaust valve 54 becomes medium long. Likewise, the overlap period of the opposing second inlet valve 52 and first exhaust valve 53 becomes medium long.

On the other hand, in the case where the cam shaft 36 is rotated at an earlier timing by the changer mechanism 32. the overlap periods of the inlet valves 51, 52 and exhaust valves 53, 54 are respectively shortened.

Similarly to the foregoing embodiments, the valve timing changer mechanism 32 is controlled so as to change valve opening overlap periods of the inlet and exhaust valves in accordance with predefined operating regions as shown in FIG. 4. Specifically, the overlap periods are set short in a specified idle operating zone near a low speed/low load region while set long in other regions. On the other hand, a swirl control valve 40 is controlled to be closed in a low speed/low load region and a low speed/high load region, and to be opened in a low speed/medium load region. Further, in order to prevent degradation of combustibility resulting from a response delay of the valve timing changer mechanism at the time of sudden acceleration, the ECU 42 has an additional function as follows. The ECU 42 detects an accelerating state of an automotive vehicle in accordance with a changing rate of a throttle opening or like parameter. Based on the detected accelerating state. the ECU 42 controls the swirl control valve 40 so that the valve 40 is forcibly opened for a specified period when the vehicle suddenly accelerates in a specified low speed/low load region.

To the ECU 42 are input as control information an intake air amount Q detected by an air-flow meter 13, throttle opening TVO detected by a throttle opening sensor 44, and engine speed N detected by an engine speed sensor 43.

Hereafter, a valve opening overlap control, swirl control, and timer counting operation of this embodiment will be described with reference to flow charts shown in FIGS. 9, 10 and 11 respectively. A count value T of a timer provided in the ECU 42, which is used in the following flow charts, is adapted to provide a period during which the swirl control valve 40 is opened in response to sudden acceleration. In the below-mentioned processings shown in FIG. 11, the count value T is set to T0 upon discriminating a specified sudden acceleration, and becomes 0 upon lapse of a specified period.

It should be appreciated that description will be directed to one cylinder and associated elements provided in an induction system of this embodiment.

(1) Valve Opening Overlap Control

Figure 9:
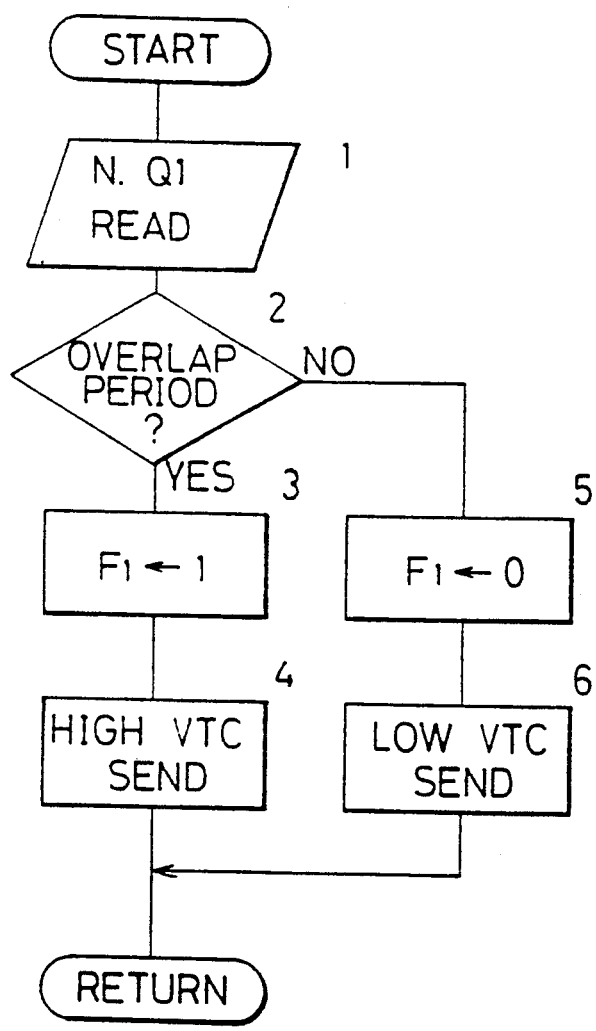
FIG. 9 is a flow chart showing a "Valve Opening Overlap Control Routine"

FIG. 9 shows a "Valve Opening Overlap Control Routine."

In Step #1, the engine speed N and intake air amount Q are read as control information. Subsequently, in Step #2, it is discriminated whether an operating condition of an engine is in a region where the valve opening overlap periods should be long. In this embodiment, the overlap periods are set short in a very low speed/low load region A1 as shown in FIG. 4. This is because combustion stability deteriorates due to undesirable blowing of the mixture through the combustion chamber or the presence of the internally recirculated exhaust gas if the overlap periods are lengthened in such a low speed/low load region. In other regions, the overlap periods are set long so as to carry out the sufficient scavenging, thereby suppressing an occurrence of knocking. As described with respect to the second embodiment, the first inlet valve 51 and first exhaust valve 54 are arranged symmetrically with respect to a center of the cylinder bore, and accordingly the distance between the valves 51 and 53 is long. Therefore, in this case, it can be prevented that the mixture blows through the combustion chamber without being used for combustion. In addition, emission performance and fuel economy of an automotive vehicle can be improved.

In the operating condition of the engine is in the region where the valve opening overlap periods should be long, i.e. in regions other than the region A1 (YES in Step #2), an overlap flag F1 is set to 1 in Step #3. The overlap flag F1 is indicative of whether or not the valve opening overlap periods are long. The flag F1 is set to 1 in the case where the overlap periods are long while set 0 in the case where the overlap periods are short.

Subsequently, in Step #4, a valve timing control signal (VTC signal) of high level is sent to a valve timing changer mechanism 32. Upon receipt of the VTC signal, the changer mechanism 32 causes the cam shaft 36 to rotate at a delayed timing, and thereby lengthening the valve opening overlap periods. With this arrangement, the scavenging can be carried out effectively and the occurrence of knocking can be prevented. Thereafter, this routine returns to Step #1.

On the other hand, if the operating condition of the engine is discriminated to be in the region A1 (NO in Step #2), the overlap flag F1 is set to 0 in Step #5. Subsequently, in Step #6, the ECU 42 sends a VTC signal of low level to the valve timing changer mechanism 32, and thereby shortening the valve timing overlap periods. With this arrangement, the combustion stability can be enhanced. Thereafter, this routine returns to Step #1.

(2) Swirl Control

Figure 10:
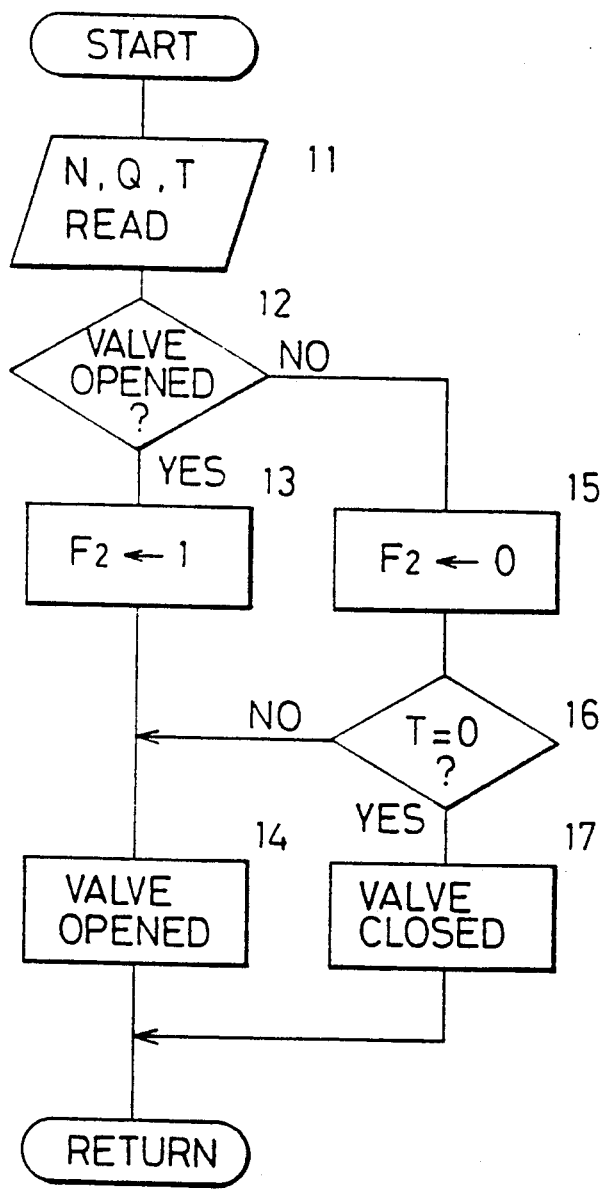
FIG. 10 is a flow chart showing a "Swirl Control Routine"

FIG. 10 shows a "Swirl Control Routine".

In Step #11, the engine speed N, intake air amount Q, and count value T of the timer are read as control information.

Subsequently, in Step #12, it is discriminated whether the operating condition of the engine is in a region where the swirl control valve 40 should be opened. In other words, it is discriminated whether the operating condition of the engine is in the low speed/medium load region B or high speed region D.

If the operating condition of the engine is in the region where the valve 40 should be opened, i.e. in the region B or D (YES in Step #12), a valve opening flag F2 is set to 1 in Step #13. The valve opening flag F2 is indicative of whether or not the swirl control valve 40 is opened. The flag F2 is set to 1 in the case where the valve 40 is opened while set to 0 in the case where the valve 40 is closed.

Subsequently, the swirl control valve 40 is opened in Step #14, and this routine returns to Step #11.

On the other hand, if the operating condition of the engine is in a region where the swirl control valve 40 should be closed, i.e. in the region A or C shown in FIG. 4 (NO in Step #12), the flag F2 is set to 0 in Step #15. Subsequently, it is discriminated whether the count value T of the timer is equal to 0 in Step #16. Setting of a value T0 and counting of the timer are carried out in manners as will be described later with reference to a "Timer Count Routine" shown in FIG. 11.

If T=0 (YES in Step #16), the swirl control valve 40 is closed in Step #17 since the vehicle is not in the sudden acceleration. Then, this routine returns to Step #11.

On the other hand, if T≠0 (NO in Step #16), the valve 40 is opened in Step #14 and this routine returns to Step #11 as described above.

(3) Timer Count

Figure 11:
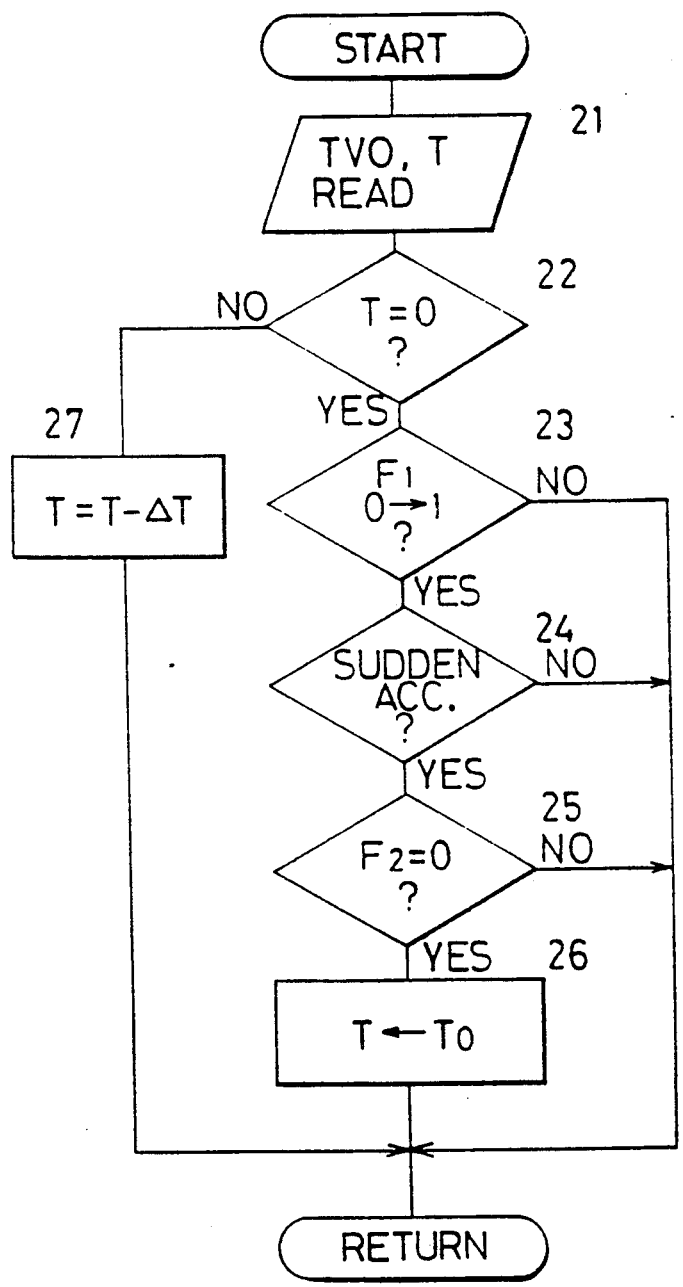
FIG. 11 is a flow chart showing a "Timer Count Routine"
Figure 12:
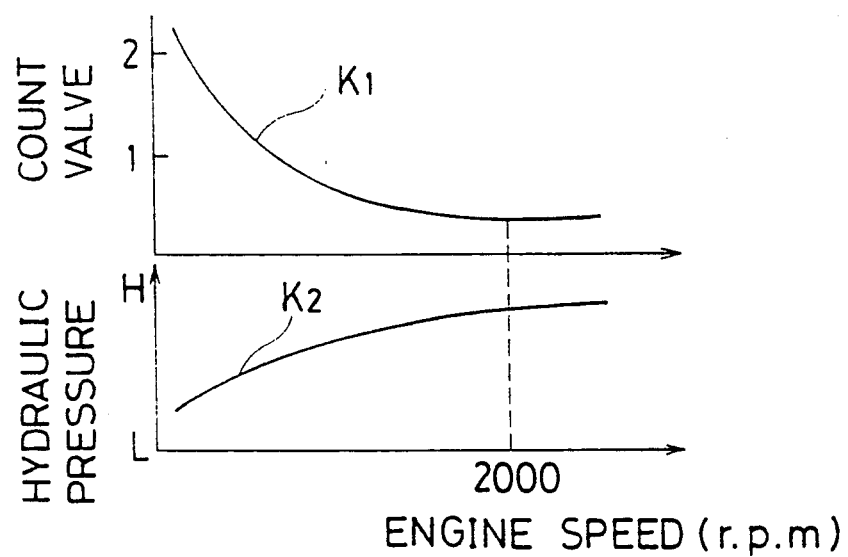
FIG. 12 is a diagram graphically showing characteristics of a set timer count value and hydraulic pressure as functions of an engine speed.

In the "Timer Count Routine" shown in FIG. 11, the count value T of the timer is set at a specified value T0 upon start of the sudden acceleration when the valve opening overlap periods are short and the swirl control valve 40 is closed. Thereafter, the count value T is decremented by a predetermined value ΔT, and the counting operation is stopped when the count value T becomes 0.

In Step #21, the throttle opening TVO and current count value T of the timer are read.

Then, it is discriminated whether the count value T is equal to 0 in Step #22. If T≠0 (NO in Step #22), it means that the timer is in the middle of the counting operation. Accordingly, the count value T is decremented by the predetermined value ΔT in Step #27, and the counting operation is continued.

If T=0 (YES in Step #22), it is discriminated whether the state of the overlap flag F1 has been just changed from 0 to 1 in Step #23. In other words, it is discriminated whether the operating condition of the engine has been just changed from the region where the valve timing overlap periods should be short to another region where they should be long. In Step #24, it is discriminated whether the vehicle is in the sudden acceleration based on a speed at which the throttle opening TVO is changed. In Step #25, it is discriminated whether the valve opening flag F2 is set at 0, i.e. the swirl control valve 40 is closed. In the case where the state of the flag F1 has been just changed from 0 to 1; the sudden acceleration is started; and the valve 40 is closed (YES in Step ##23 to #25), the count value T is set at the value T0 in Step #26. The value T0 is a function of the engine speed N as indicated by a curve K1 in a graph shown in FIG. 12. More specifically, a hydraulic pressure applied to the valve timing changer mechanism 32 increases as the engine speed N increases as indicated by a curve K2. The higher the hydraulic pressure, the shorter a response delay of the changer mechanism 32. Accordingly, the value TO becomes smaller as the engine speed N increases. After Step #26, this routine returns to Step #21.

In addition to the functions and effects of the first and second embodiments, the third embodiment demonstrates the following. There can be effectively prevented an occurrence of knocking due to the response delay of the valve opening changer mechanism 32 at the time of sudden acceleration in the region where the valve opening overlap period is short, thereby enhancing a response of the engine to acceleration.

More specifically, as described above, in the region A1 near the idle operation zone, internally recirculated exhaust gas is reduced in its volume because the valve opening overlap period is short. Thereby, the combustion stability can be enhanced. The combustion stability can be further enhanced by swirl generation. On the other hand, in the regions other than the region A1, the scavenging is improved because the overlap periods are long, and thereby the occurrence of knocking can be prevented. Particularly, in the low speed/high load region, the undesired blowing of the mixture through the combustion chamber is suppressed while providing satisfactory scavenging. In addition, the combustibility is improved and the engine output is enhanced by swirl generation.

However, in the case where the operating condition of the engine is changed from the region A1 to the region C due to the sudden acceleration, the valve opening changer mechanism 32 of the hydraulic type is attended with a response delay. Such a response delay normally lasts about 1 to 2 seconds. Yet, a valve opening changer mechanism of the electromagnetic type is also attended with a response delay though shorter than that of the hydraulic changer mechanism 32.

In view of the above, the engine is operated under high load while the overlap periods are set short for a specified period following start of the sudden acceleration. In this case, the knocking is liable to occur due to the poor scavenging. If the swirl is generated in addition to this, the mixture near an ignition plug becomes lean, thereby deteriorating ignitability and causing the knocking. Accordingly, at the time of sudden acceleration in the region where the overlap period is short (region A1), the swirl control valve 40 is opened only for the specified time TO corresponding to the response delay of the changer mechanism 32. In this way, the swirl generation is suspended for the specified time TO so as to prevent the occurrence of knocking.

Figure 13:
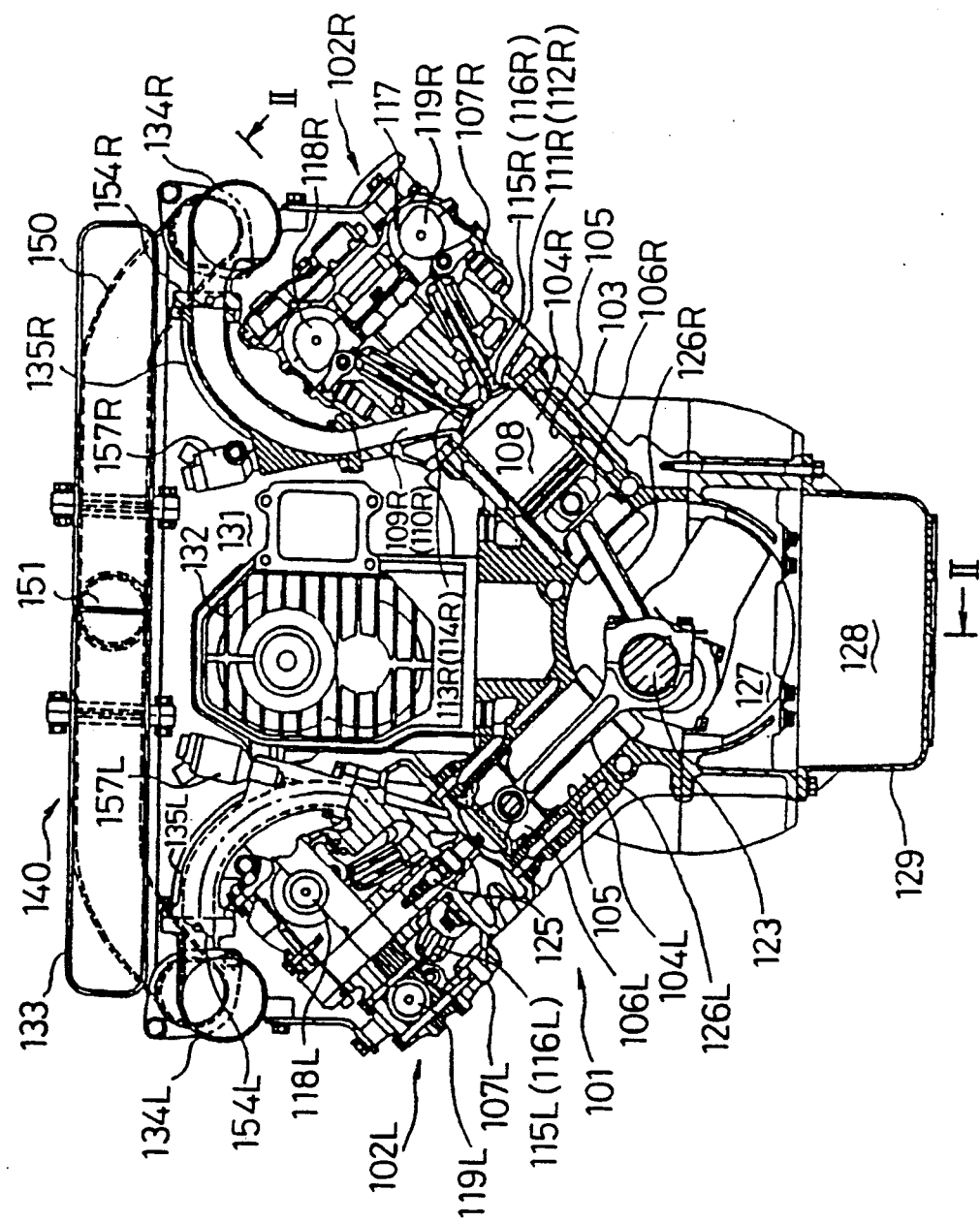
FIG. 13 is a longitudinal sectional view showing a detailed construction of a V-shaped engine.
Figure 14:
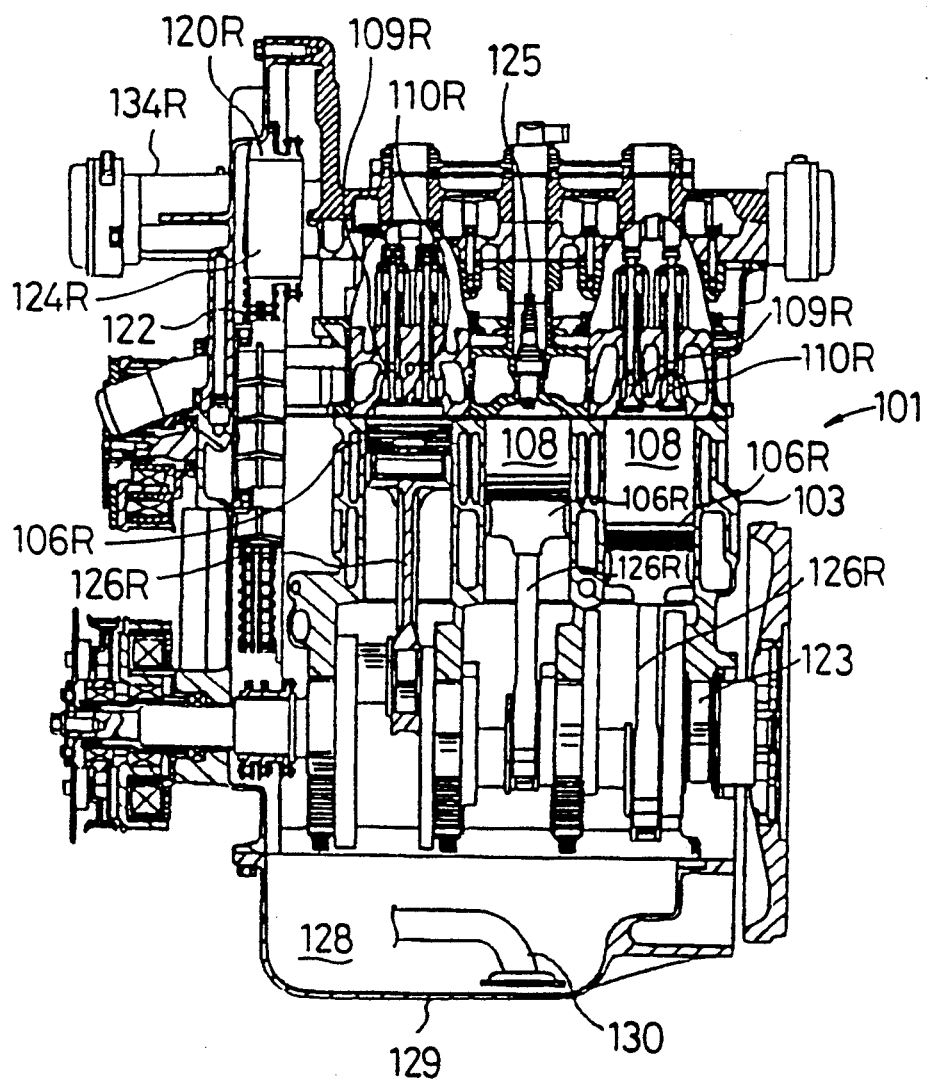
FIG. 14 is a sectional view taken along the line II—II in FIG. 13.
Figure 15:
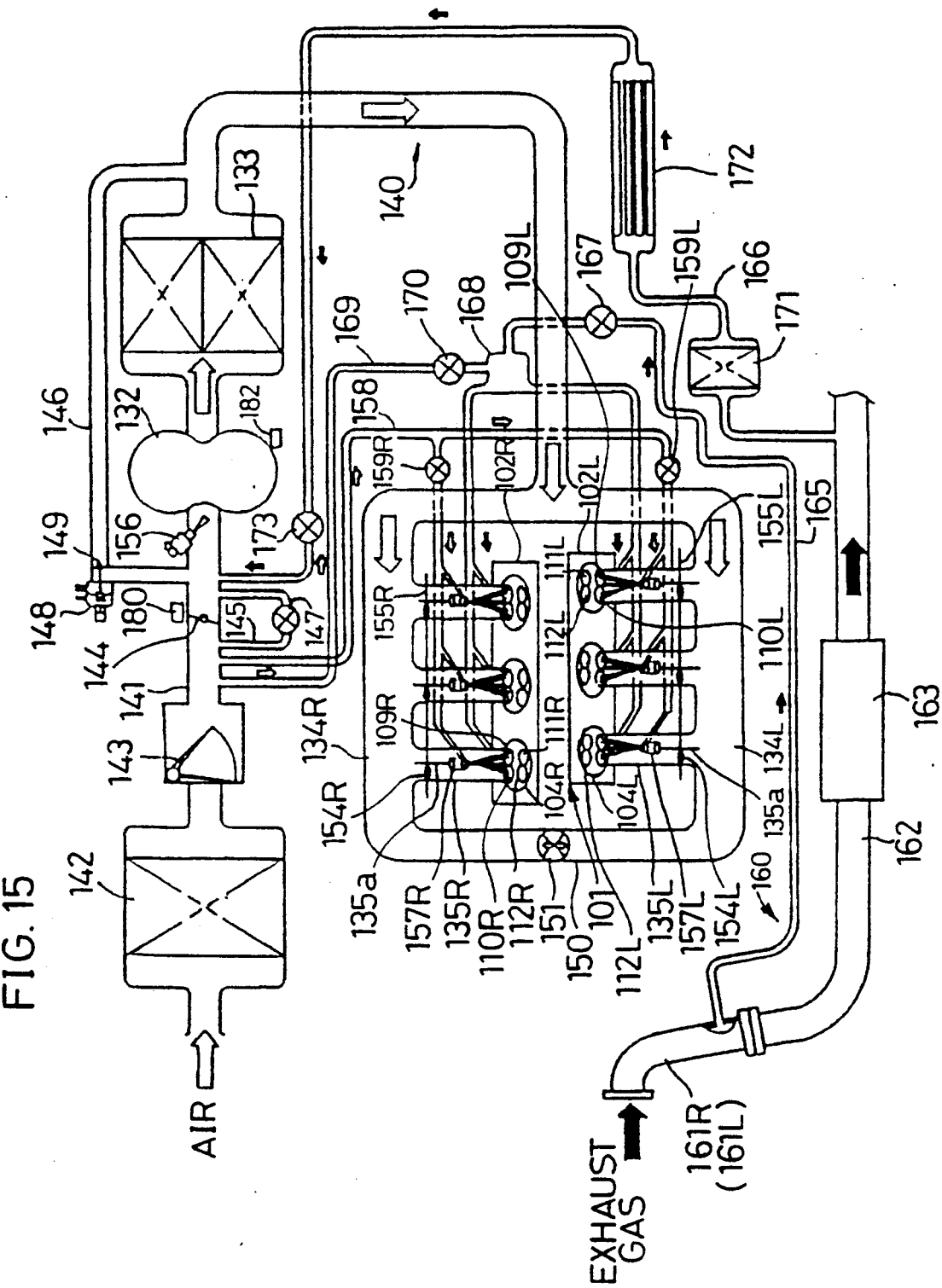
FIG. 15 is a schematic diagram showing a construction of an induction system and an exhaust system of the engine.
Figure 16:
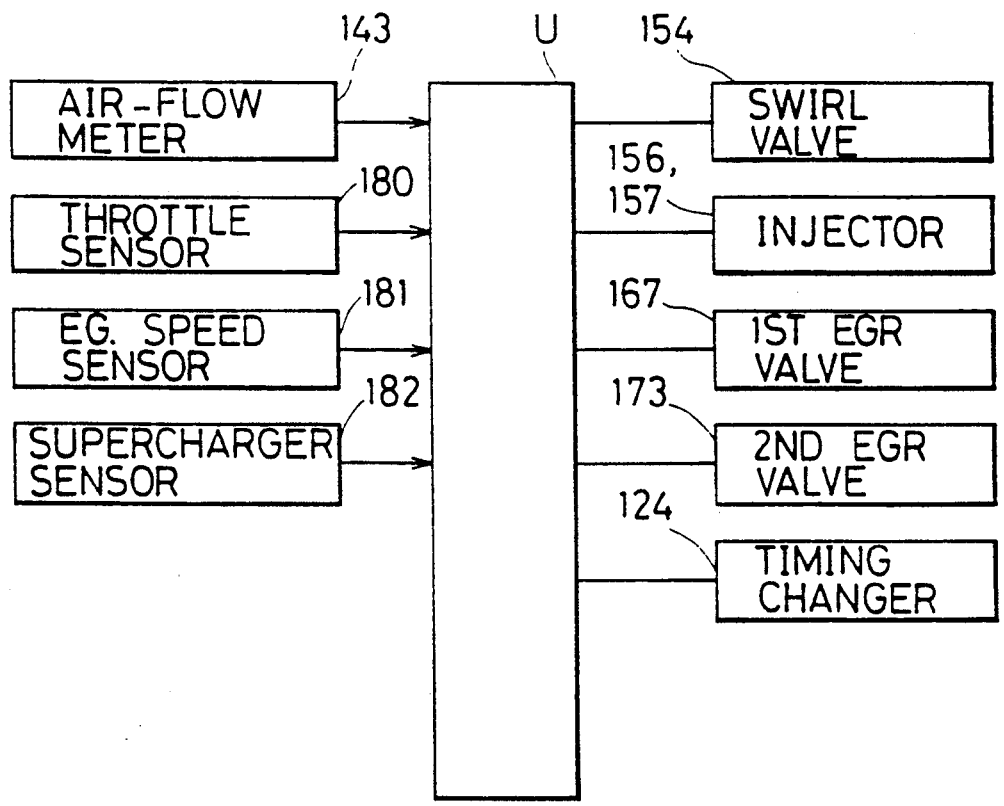
FIG. 16 is a block diagram showing a control system of the engine.

FIGS. 13 to 16 show another example of engine into which the first to third embodiments can be incorporated. FIG. 13 is a longitudinal sectional view showing a detailed construction of a V-shaped engine; FIG. 14 is a sectional view taken along the line II—II in FIG. 13; FIG. 15 is a schematic diagram showing a construction of an induction system and an exhaust system of the engine; and FIG. 16 is a block diagram showing a control system of the engine.

The engine shown in these figures is a, so called, V-shaped six cylinder engine. An engine main body 101 includes a left bank 102L and a right bank 102R arranged transversely and jointly forming a V-shape as shown in FIG. 13. Each bank is provided with three cylinders 104 defined therein in a row along a lengthwise direction thereof. In the drawings, parts constituting or relating to the left and right bank 102L and 102R are designated at numerals affixed with "L" and "R." However, in the description, "L" and "R" are omitted unless particularly necessary.

The engine main body 101 includes a cylinder block 103 and a cylinder head 107. A piston 106 is fittably inserted into each cylinder 104, and a combustion chamber 108 is defined by the piston 106 and cylinder head 107 therein. In the respective banks, two (first and second) inlet ports 109, 110, and two (first and second) exhaust ports 111, 112 in communication with the corresponding combustion chamber 108 are formed in the cylinder head 107, see FIG. 14. At the first and second inlet ports 109, 110 are provided first and second inlet valves 113, 114 respectively as shown in FIG. 14. Further, at the first and second exhaust ports 111, 112 are provided first and second exhaust valves 115, 116 respectively as shown in FIG. 14.

A valve lifting mechanism 117 is of the, so-called, double overhead cam (DOHC) type wherein two came shafts 118, 119 are accommodated in the cylinder head 107. Each of these cam shafts 118, 119 has a cam pulley 120 (see FIG. 14 wherein a cam pulley for the exhaust valves is unillustrated) disposed at one end thereof. These cam pulleys 120 are coupled to an engine output shaft (crankshaft) 123 by way of a timing belt 122 as well-known.

A valve timing changer mechanism 124 for changing the opening timing of the inlet valves is mounted to the cam shaft 118 at the inlet side. Through unillustrated, another valve timing changer mechanism 124 for changing the opening timing of the exhaust valves is mounted to the cam shaft 119 at the exhaust side. Further, an ignition plug 125 is attached to the cylinder head 107 in such manner as to face a center of the combustion chamber 108.

The pistons 106 are coupled to the crankshaft 123 through connecting rods 126. Below a crankcase accommodating the crankshaft 123 therein is formed an oil tank 128 containing engine oil therein. The oil tank 128 is formed of oil pan 129. Indicated at 130 in FIG. 14 is an oil strainer.

As shown in FIG. 13, in a space 131 defined between the left and right banks 102L, 102R is mounted a mechanical supercharger 132 which is driven by the rotational force of the crankshaft 123. Further, an intercooler 133 is disposed above the supercharger 132. On the other hand, above the left and right banks 102L and 102R each are arranged a surge tank 134 extending a longitudinal direction of the crankshaft 123. The surge tanks 134 and inlet ports 109, 110 for the respective cylinders 104 are connected to each other through individual intake runners 135. Upstream ends of the inlet ports 109, 110 are opened to the space 131 between the left and right banks 102L, 102R. Accordingly, the individual intake runners 135 are formed in such a manner as to extend from the corresponding surge tanks 134 horizontally toward a center of the space 131 and are then curved downwards.

As shown in FIG. 15, an induction system 140 includes a common intake passage 141, left and right surge tanks 134L, 134R, and individual intake runners 135 connected sequentially in this order from an upstream side. In the common intake passage 141, there are provided an air cleaner 142, air-flow meter 143, throttle valve 144, mechanical supercharger 132, and intercooler 133 arranged in this order from the upstream side. To the common intake passage 141 are connected a first bypass pipe 145 for bypassing the throttle valve 144 and a second bypass pipe 146 for bypassing the supercharger 132 and intercooler 133.

In the first bypass pipe 145 is disposed on idle speed control (ISC) valve 147 for regulating an engine speed in an idle operating zone in a manner well-known to those skilled in the art. In the second bypass pipe 146 is disposed a relief valve 149 which is driven by an actuator 148 of the diaphragm type. Upon the supercharged pressure increasing in excess of a specified value, the relief valve 149 is opened, i.e. the second bypass pipe 146 is opened, so as to relieve a portion of the supercharged air. On the other hand, the left and right surge tanks 134L, 134R are in communication with each other through a connecting passage 150. A control valve 151 is disposed in a specified position in the connecting passage 150. The control valve 151 is opened and closed, e.g. according to the engine speed, to control the intake air, so that dynamic effects of the intake air can be obtained in a wide range of operating regions of the engine.

Each intake runner 135 includes a partitioning wall 135a for partitioning a plenum of the runner 135 partially longitudinally into a first runner portion 152 extending to the first inlet port 109 and a second runner portion 153 extending to the second inlet port 110. A swirl control valve 154 is disposed in an upstream portion of each second runner portion 153 for opening and closing the runner portion 153. The swirl control valves 154 arranged in the left bank 102L are coupled to a common shaft 155L while those arranged in the right bank 102R are coupled to another common shaft 155R. These shafts 155L and 155R each have an unillustrated actuator connected to one end thereof.

A fuel supply system includes an upstream injector 156 and downstream injectors 157. The upstream injector 156 is disposed right upstream of the supercharger 132. On the other hand, each downstream injector 157 is disposed in a specified position in the corresponding intake runner 135. Specifically, the downstream injectors 157 are disposed in such a manner as to face both the first and second inlet ports 109, 110 corresponding thereto. Indicated at 158 in FIG. 15 is an assist air pipe, and at 159 a check valve.

At exhaust system 160 includes exhaust manifolds 161L, 161R extending respectively from the left and right banks 102L, 102R, and common exhaust passage 162 sequentially connected in this order from the upstream side. The common exhaust passage 162 has a catalytic converter 163 for purifying the exhaust gas disposed in a specified position therein, and has an unillustrated silencer disposed at a downstream end thereof.

Further, the engine is provided with a mechanism for carrying out an external EGR. The external EGR mechanism includes first and second external EGR pipes 165, 166 shown in FIG. 15. When compared, the diameter of the first external EGR pipe 165 is smaller than that of the second external EGR pipe 166.

The first external EGR pipe 165 has one end thereof connected to either the exhaust manifold 161L or 161R, and has the other end thereof connected to the first inlet ports 109. In the first external EGR pipe 165, there are provided a first EGR valve 167 and collecting chamber 168 arranged in this order as the pipe 165 extends from the one end thereof to the other. The collecting chamber 168 is in communication with the common intake passage 141 through a bypass air pipe 169 in which a bypass air control valve 170 is disposed. On the other hand, the second external EGR pipe 166 has one end thereof connected to the common exhaust passage 162 at a portion downstream of the catalytic converter 163, and has the other end thereof connected to the common intake passage 141 at a portion between the supercharger 132 and throttle valve 144. In the second external EGR pipe 66, there are provided a carbon trap 171, EGR cooler 172, second EGR valve 173 arranged in this order as the pipe 166 extends from the one end thereof to the other. The EGR valves 167, 173 are controlled by a control unit U to be described below in the following manner. The external EGR is suspended, i.e. the external EGR pipes 165, 166 are both closed, in a low speed/low load region near the idle operating zone; the first external EGR pipe 165 is opened in other low load regions; and the second external EGR pipe 166 is opened in the high load region.

Specifications of the above described engine are as follows:

(1) Engine type: V-shaped six cylinder DOHC engine
(2) Number of valves per cylinder: 4
(3) Angle defined by left and right angle: 90 degrees
(4) Total displacement: 1496 cc
(5) Cylinder bore: 63 mm (diameter)
(6) Piston stroke: 80 mm
(7) Compression ratio ($\epsilon$): 10
(8) Angle formed by valve stems of inlet valve and exhaust valve; 30 degrees
(9) Supercharger; screw type (compression ratio=2.5)
(10) Temperature at outlet of intercooler; 60° C.
(11) Fuel in use; regular gasoline (octane number=91)

More specifically, in this engine, the cylinders 104 are formed such that the diameter of the cylinder bore is small and the piston stroke is longer than the diameter of the cylinder bore. Further, the compression ration is set high and the pressure of the supercharger is also set high.

This engine is provided with a control unit U shown in FIG. 16. The control unit U is constituted from, for example, a microcomputer, and include a CPU (central processing unit), ROM (read only memory), RAM (random access memory) and the like. To the control unit U are input signals from the air-flow meter 143, throttle opening sensor 180, engine speed sensor 181, sensor 182 for detecting a rotating amount of a screw provided in the supercharger, etc. Upon receipt of these signals, the control unit U controls the swirl control valves 154 and valve timing changer mechanisms in the aforementioned manner. In addition, the control unit U controls the EGR and fuel injection from the injectors.

As described above, in accordance with the invention, two inlets ports are provided which are in communication with a corresponding cylinder defined in an engine provided with a mechanical supercharger, and a swirl control valve is disposed is one of the two inlet ports. The swirl control valve is opened in a low speed/medium load region while closed in a low speed/high load region and a low speed/low load region. Accordingly, the scavenging performance can be enhanced sufficiently even in the low speed/medium load region where the supercharged pressure is not considerably high compared with the exhaust pressure. On the other hand, in the low speed/high load region where the supercharged pressure is high, the undesirable blowing of mixture through a combustion chamber without being used for combustion can be suppressed while maintaining the sufficient scavenging performance, and an occurrence of knocking can be prevented.

Further, two inlet ports each including an inlet valve and two exhaust ports each including an exhaust valve are provided for each cylinder of the engine. The two inlet valves are opened at different timings, and a valve opening overlap period of the inlet valve opened at an earlier timing and an exhaust valve positioned diagonally therefrom is set long. In addition, a swirl control valve is disposed in the inlet port corresponding to the inlet valve opened at a delayed timing. Accordingly, the undesired blowing of the mixture through the combustion chamber without being used for combustion can be suppressed even in a state where the swirl control valve is opened. Further, since the sufficiently long valve timing overlap period is ensured even in a state where the swirl control valve is closed, the satisfactory scavenging performance is obtainable when intake air is supercharged at a high compression ratio. Therefore, the scavenging performance according to an operating condition of the engine can be further enhanced, and improved effects will be brought about due to the suppressed undesired blowing of the mixture through the combustion chamber.

Moreover, a valve timing changer mechanism is controlled so as to shorten the valve timing overlap periods in a specified low speed/low load region. Accordingly, the combustion stability can be enhanced in such a region.

Furthermore, at the time of sudden acceleration in a specified low speed/low load region in a state where the valve opening overlap periods are short and the swirl control valve is opened, the swirl control valve is opened for a specified period. With this arrangement, generation of swirl can be suppressed and an occurrence of knocking can be prevented when the scavenging performance is poor under high load due to a response delay of actuation of the valve timing changer mechanisms. The occurrence of knocking can be prevented even when a valve timing changer mechanism of the hydraulic type which has a longer response delay is adopted.

Further, the swirl control valve is forcibly opened for a period corresponding to the response delay of the valve timing changer mechanism. Thereby, prevention of knocking during the response delay period and the scavenging making use of swirl thereafter can be carried out in an appropriate manner.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An induction system for use in an engine including a cylinder having a combustion chamber the induction system comprising:
   an intake manifold having first and second inlet ports in communication with the cylinder;
   a mechanical supercharger disposed in the intake manifold;
   valve means disposed in the second inlet port for controlling generation of swirl in the combustion chamber, the valve means being operable to open and close the second inlet port; and
   control means for controlling the valve means to open the second inlet port in a low speed/medium load operating region of the engine while controlling the same to close the second inlet port in a low speed/high load region and a low speed/low load operating region of the engine.

2. An induction system as defined in claim 1 further comprising:
   first and second exhaust ports in communication with the cylinder;
   first and second inlet valves provided respectively for the first and second inlet ports;
   first and second exhaust valves provided respectively for the first and second exhaust ports, the first exhaust valve being positioned more spaced apart from the first inlet valve than the second exhaust valve; and
   valve lifting means for opening the first inlet valve at an earlier timing than the second inlet valve and for closing the second exhaust valve at an earlier timing than the first exhaust valve, such that an overlap period of openings of the first inlet valve and first exhaust valve is longer than any other overlap period of openings of the inlet and exhaust valves.

3. An induction system as defined in claim 1 further comprising:
   first and second exhaust ports in communication with the cylinder;
   first and second inlet valves provided respectively for the first and second inlet ports;
   first and second exhaust valves provided respectively for the first and second exhaust ports;
   valve lifting means including changer means for changing overlap periods of openings of the inlet valves and exhaust valves; and
   means for controlling the changer means to shorten the overlap periods in a specified low speed/low load operating region and to lengthen the same in other operating regions.

4. An induction system as defined in claim 2 wherein the valve lifting means includes changer means for changing overlap periods of openings of the inlet valves and exhaust valves, the induction system further comprising means for controlling the changer means to shorten the overlap periods in a specified low speed/low load operating region and to lengthen the same in other operating regions.

5. An induction system as defined in claim 3 further comprising means for forcibly opening the valve means for a specified opening period at the time of sudden acceleration in an operating region where the overlap periods are set shorter.

6. An induction system as defined in claim 5 wherein the changer means is of the hydraulically actuatable type.

7. An induction system as defined in claim 6 wherein the specified opening period lasts until actuation of the changer means is completed following start of the sudden acceleration.

* * * * *